(12) United States Patent
Pfau et al.

(10) Patent No.: US 9,766,704 B2
(45) Date of Patent: Sep. 19, 2017

(54) TOUCH SURFACE AND MICROPROCESSOR ASSEMBLY

(71) Applicants: Douglas Allen Pfau, Canton, MI (US); Jay Patrick Dark, Canton, MI (US); David Michael Whitton, Saline, MI (US)

(72) Inventors: Douglas Allen Pfau, Canton, MI (US); Jay Patrick Dark, Canton, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 199 days.

(21) Appl. No.: 13/737,999

(22) Filed: Jan. 10, 2013

(65) Prior Publication Data

US 2013/0207927 A1    Aug. 15, 2013

Related U.S. Application Data

(60) Provisional application No. 61/591,454, filed on Jan. 27, 2012, provisional application No. 61/591,477, filed on Jan. 27, 2012.

(51) Int. Cl.
*G06F 3/044*     (2006.01)
*G06F 3/01*      (2006.01)
*G06F 3/045*     (2006.01)

(52) U.S. Cl.
CPC .............. *G06F 3/016* (2013.01); *G06F 3/044* (2013.01); *G06F 3/045* (2013.01); *G06F 2203/04105* (2013.01)

(58) Field of Classification Search
CPC ........ G06F 3/0414; G06F 3/041; G06D 3/044
USPC .................................................. 345/173–177
See application file for complete search history.

(56) References Cited

U.S. PATENT DOCUMENTS

| | | | |
|---|---|---|---|
| 7,359,846 B1* | 4/2008 | Fernandez | G06F 17/5031 703/13 |
| 2006/0284836 A1* | 12/2006 | Philipp | G06F 3/03547 345/156 |
| 2007/0040815 A1* | 2/2007 | Rosenberg | A63F 13/06 345/173 |
| 2007/0146348 A1* | 6/2007 | Villain | 345/173 |
| 2008/0053809 A1* | 3/2008 | Shimazu et al. | 200/530 |
| 2009/0015549 A1* | 1/2009 | Gelfond et al. | 345/156 |
| 2009/0207152 A1* | 8/2009 | Nakamura | G06F 3/03547 345/174 |

(Continued)

OTHER PUBLICATIONS

Oct. 10, 2013. "Capacitive sensing" wikipedia.org.

*Primary Examiner* — Kent Chang
*Assistant Examiner* — Sujit Shah
(74) *Attorney, Agent, or Firm* — Dickinson Wright PLLC

(57) ABSTRACT

A touch assembly is provided including a touch surface for receiving a touch force. At least one haptic feedback device is coupled to the touch surface for selectively vibrating the touch surface. At least one switch is operably coupled with the touch surface and is adjustable between an activated configuration and a deactivated configuration. At least one microprocessor is in electrical communication with the at least one haptic feedback device and the at least one switch for actuating the at least one haptic feedback device in response to the at least one switch adjusting from the activated configuration to the deactivated configuration.

11 Claims, 3 Drawing Sheets

(56) References Cited

U.S. PATENT DOCUMENTS

| | | | |
|---|---|---|---|
| 2010/0156818 A1* | 6/2010 | Burrough et al. | 345/173 |
| 2010/0188327 A1* | 7/2010 | Frid | G06F 3/016 |
| | | | 345/156 |
| 2010/0328232 A1* | 12/2010 | Wood | G06F 3/0488 |
| | | | 345/173 |
| 2011/0025631 A1* | 2/2011 | Han | 345/173 |
| 2011/0043447 A1* | 2/2011 | Inaba | G06F 3/0354 |
| | | | 345/157 |
| 2011/0163985 A1* | 7/2011 | Bae | G06F 3/016 |
| | | | 345/173 |
| 2011/0227872 A1* | 9/2011 | Huska et al. | 345/174 |
| 2012/0116672 A1* | 5/2012 | Forutanpour et al. | 701/431 |
| 2013/0082979 A1* | 4/2013 | Rabu | G06F 3/0414 |
| | | | 345/175 |

* cited by examiner

TOUCH SURFACE AND MICROPROCESSOR ASSEMBLY

CROSS REFERENCE TO RELATED APPLICATION

This application claims the benefit of U.S. Provisional Patent Application Ser. No. 61/591,454 filed Jan. 27, 2012 and U.S. Provisional Patent Application Ser. No. 61/591,477 filed Jan. 27, 2012, the entire content of both applications are hereby incorporated by reference.

BACKGROUND OF THE INVENTION

1. Field of the Invention

The present invention is related generally to touch assemblies and more particularly to touch assemblies configured to provide haptic feedback.

2. Related Art

Touch surface assemblies are becoming increasingly common in cellular telephones, laptop computers, tablet computers, automobiles, etc. In automobiles, touch screens are often used to control, for example, a navigation system; a radio; a heating, ventilation and air conditioning (HVAC) system; etc. Typical touch screen assemblies (which are a subset of touch surfaces) are configured to actuate in response to a person's finger touching or pressing on a transparent surface on the front of the monitor and applying a touch force onto the touch screen assembly.

Typical touch screen assemblies include touch screen monitors which are mounted in the vehicle and remain stationary when pressed and actuate in response to any touch force, even if a person very lightly touches the touch screen monitor. This often leads to inadvertent activations. Some touch screen assembly manufacturers have attempted to solve this problem by monitoring the touch force applied to the surface of the touch screen monitor with a force gauge only actuating the touch screen assembly in response to the touch force exceeding a predetermined threshold. Sometimes, a haptic feedback means is provided to provide some sort of feedback, such as a vibration, to the person who applied the touch force that exceeded the predetermined threshold, thereby alerting the person to a proper activation of the touch screen monitor. The sensors employed in many known touch screen assemblies are high resolution force gauges which are also very costly.

There remains a continuing need for a less costly system that only provides a haptic feedback in response to intentional actuations of the touch screen monitor.

SUMMARY OF THE INVENTION

One aspect of the present invention relates to a touch assembly. The touch assembly includes a touch surface for receiving a touch force and at least one haptic feedback device coupled to the touch surface. At least one switch is operably coupled with the touch surface and is adjustable between and activated configuration and a deactivated configuration. At least one microprocessor is in electrical communication with the at least one haptic feedback device and with the at least one switch for actuating the at least one haptic feedback device in response to the at least one switch adjusting from the activated configuration to the deactivated configuration. This is advantageous because a normally activated switch may be more easily installed into the touch assembly than the sensors employed in other known touch assemblies and no special calibration procedure is required.

Additionally, the digital nature of the switch lends to improved reliability as compared to the high precision force sensors found in other known touch assemblies. In the cases where the sensor normally provides a variable output, then the signals from multiple sensors can be combined to provide improved resolution.

According to another aspect of the present invention, the activated configuration of the at least one switch is an engaged configuration that establishes a closed electrical circuit and the deactivated configuration is a disengaged configuration that opens the electrical circuit. Such a switch could be, for example, a force sensing resistor.

According to yet another aspect of the present invention, the touch assembly includes a base with the touch surface being positioned on one side of the base and the at least one switch being positioned on an opposite side of the base. A plunger is operably coupled to the touch surface and extends through the base and is biased against the at least one switch to activate the at least one switch and wherein movement of the touch surface relative to the base separates the plunger from the at least one switch to deactivate the at least one switch.

According to still another aspect of the present invention, capacitive sensing is employed to measure the dielectric value of the system and the activated and deactivated configurations are based on the measured capacitance.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
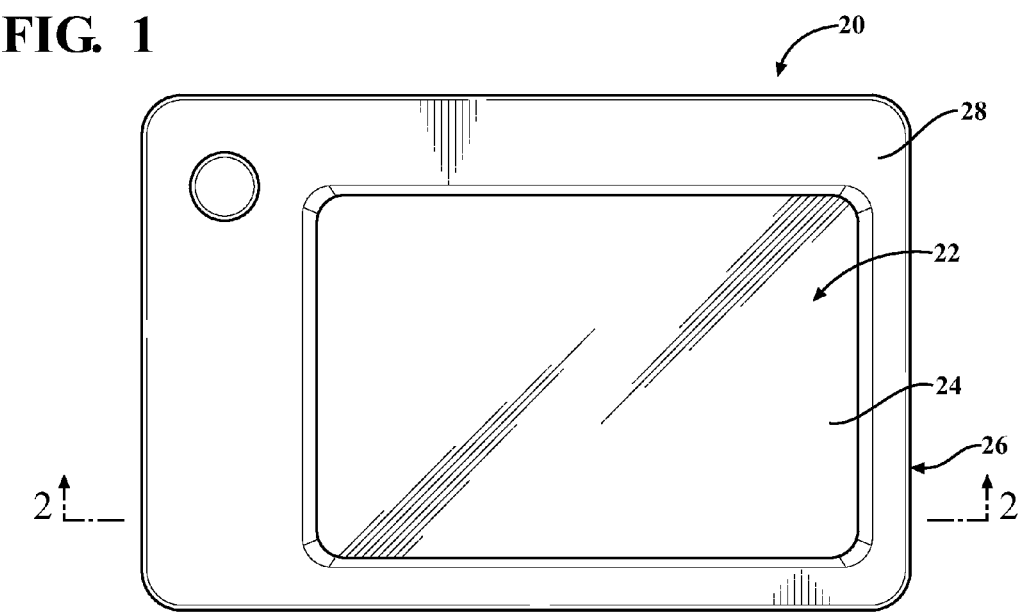
FIG. 1 is a top view of a first exemplary embodiment of the touch assembly.
Figure 2:
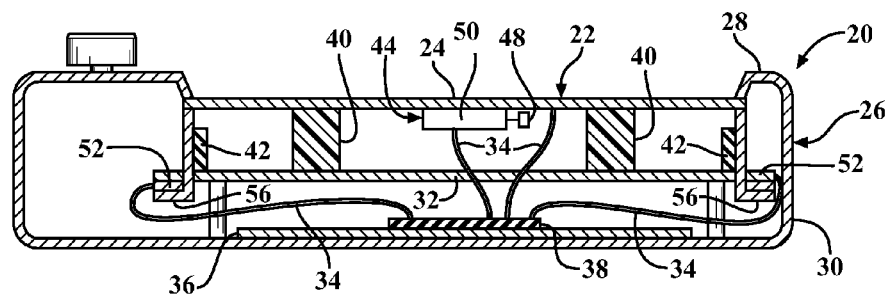
FIG. 2 is a cross-sectional view of the first exemplary embodiment of the touch assembly taken through line 2-2 of FIG. 1 and showing a plurality of switches in an activated condition.
Figure 3:
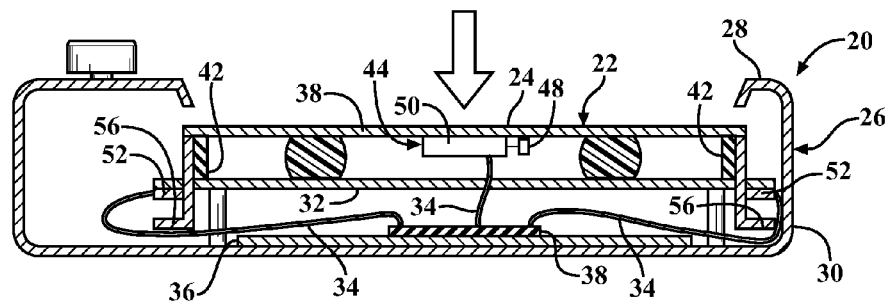
FIG. 3 is another cross-sectional view of the first exemplary embodiment of the touch assembly and showing the plurality of switches in a deactivated condition.

Referring to the Figures, wherein like numerals indicate corresponding parts throughout the several views, a first exemplary touch assembly 20 is generally shown in FIGS. 1-3. As shown in FIG. 1, the first exemplary touch assembly 20 includes a touch screen monitor 22 with an upper surface 24 for receiving a touch force and a housing 26 which contains and supports the touch screen monitor 22. Although it is depicted in the exemplary embodiments as a touch screen monitor 22, it should be appreciated that the touch assembly 20 could have any desirable type of touch surface configured to receive a touch force, i.e. it does not have to be a monitor.

As shown in FIG. 1, in the first exemplary embodiment, the exemplary touch screen monitor 22 and the housing 26 have generally rectangular shapes. The touch screen monitor 22 could be any desirable type of flat panel monitor including, for example, a liquid crystal display (LCD) monitor, a light emitting diode (LED) monitor or a plasma monitor. Although not shown, a grid is preferably disposed on an underside of the touch screen monitor 22 for sensing the location of the touch force. Specifically, the grid is configured to determine coordinates (such as X and Y coordinates) of the touch force on the upper surface 24 of the touch screen monitor 22. The housing 26 may have any desirable shape and may be formed of any desirable material or combination of materials including, for example, polymeric, metallic or composite materials.

Referring now to FIG. 2, in the exemplary embodiment, the housing 26 includes an upper cover 28 (or bezel) and a lower cover 30 which are joined to one another through any desirable means such as fasteners, adhesives, etc. A base 32 is disposed within the housing 26 between the touch screen monitor 22 and the lower cover 30, and a printed circuit (or wire) board (main PCB 36) is disposed within the housing 26 between the base 32 and the lower cover 30. The main PCB 36 includes, inter alia, at least one microprocessor 38 which is in electrical communication with the touch screen monitor 22 for generating signals in response to the touch screen monitor 22 sensing a touch force. As shown, the base 32 of the exemplary embodiment is larger than the touch screen monitor 22 and extends outwardly on opposite sides of the touch screen monitor 22. A plurality of compression springs 40 are disposed between the touch screen monitor 22 and the base 32 to bias the touch screen monitor 22 into a resting position against the upper cover 28 of the housing 26 and spaced from the base 32 by a predetermined distance or gap. In the exemplary embodiment, the compression springs 40 are bodies of an elastic material. However, it should be appreciated that any desirable types of springs including helical springs could alternately be employed. The stiffness, or spring constants, of the compression springs 40 at least partially determines the touch force required to move the touch screen monitor 22 out of contact with the upper cover 28 of the housing 26 and towards the base 32.

A plurality of generally pill-shaped stoppers 42 are mounted to the base 32 in the gap between the base 32 and the touch screen monitor 22. The stoppers 42 have a height that is less than the gap between the base 32 and the touch screen monitor 22 to restrict movement of the touch screen monitor 22 relative to the base 32 and the housing 26. In other words, the stoppers 42 provide a stopping point beyond which the touch screen monitor 22 is restricted from movement. The stoppers 42 are preferably formed of an elastic material to protect the touch screen monitor 22 from damage in response to an excessive touch force. The stoppers 42 are preferably sized to limit movement of the touch screen monitor 22 to approximately 0.25 mm but they could be sized to limit movement of the touch screen monitor 22 by any desirable distance.

A haptic feedback device 44 is coupled to the underside of the touch screen monitor 22 for providing haptic feedback to a person who applies the touch force to the touch screen monitor 22. In the first exemplary embodiment of the touch assembly 20, which is shown in FIGS. 2 and 3, the haptic feedback device 44 is an eccentric rotating mass (ERM) vibrator 44 having an electric motor 50 with a non-symmetrical mass 48 coupled to its output. The ERM vibrator 44 is in electrical communication with the microprocessor 38 on the main PCB 36, which controls the actuation of the ERM vibrator 44. In operation, when the electric motor 50 is actuated by the microprocessor 38, the non-symmetrical mass 48 is rotated to produce a vibration, which is translated into the touch screen monitor 22 and felt by the person to alert the person that the touch screen monitor 22 has been actuated. It should be appreciated that other types of haptic feedback devices could alternately be employed to provide feedback to the person.

The touch assembly 20 also includes a plurality of sensors that are coupled to the touch screen monitor 22 and are configured to sense whether a person has intentionally actuated the touch screen monitor 22. Specifically, the sensors of the first exemplary touch assembly 20 are switches 52 which are biased into an activated configuration and only adjust to a deactivated configuration in response to the touch screen monitor 22 being urged away from the resting position and towards the base 32. The switches 52 are in electrical communication with the microprocessor 38 on the main PCB 36 such that the deactivation of any of the switches 52 signals to the microprocessor 38 to actuate the haptic feedback device 44. The switches 52 could all be wired in series with one another such that deactivation of any one of the switches 52 causes the electrical circuit to open or they could alternately be wired in parallel with one another.

Figure 4:
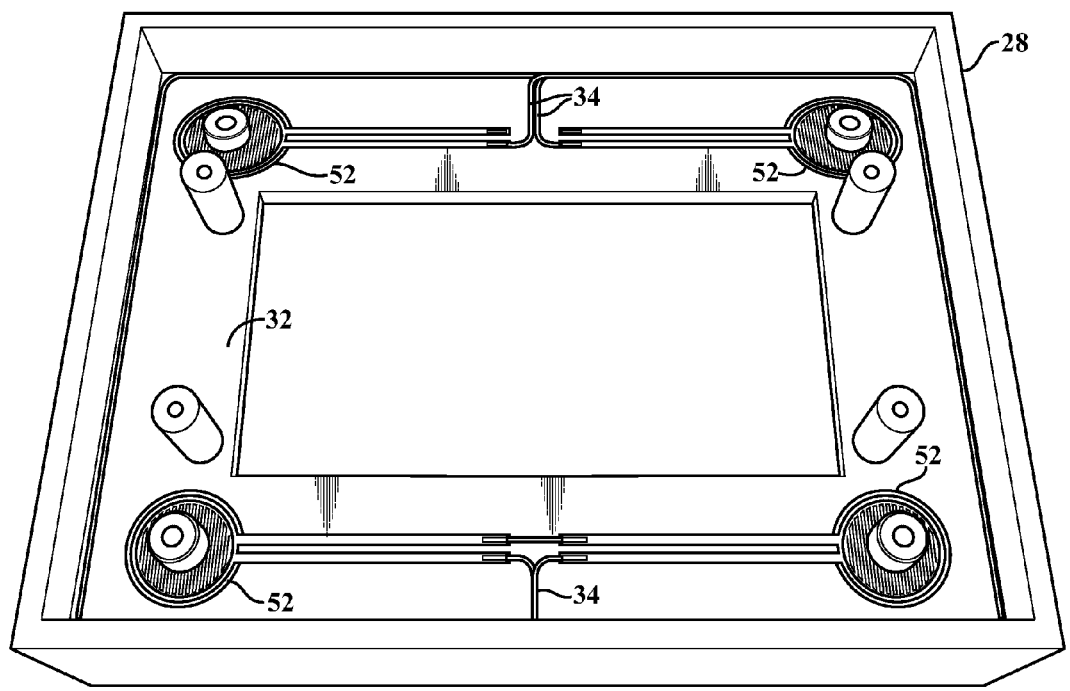
FIG. 4 a perspective elevation view of a base and a plurality of switches of the exemplary embodiment of FIG. 1.

As best shown in FIG. 4, in the first exemplary touch assembly 20, the switches 52, 54 are force sensing resistors (FSRs 52) and are positioned at the four corners of the base 32 on the side of the base 32 opposite of the touch screen monitor (not shown in this Figure). Referring back to FIG. 2, a plunger 56 is operably coupled with the touch screen monitor 22 and extends through the base 32 to the side opposite of the touch screen monitor 22. The biasing of the touch screen monitor 22 away from the base 32 and against the upper cover 28 causes the plunger 56 to be biased against the FSRs 52 with a first force, which causes the FSRs 52 to have a first, very low, resistance. When a touch force is applied to the upper surface 24 of the touch screen monitor 22 to move the touch screen monitor 22, this lowers the force applied by one or more of the plungers 56 against the FSRs 52 and increases the resistance of those FSRs 52. If the plunger 56 separates completely from the associated FSR 52 (such as shown in FIG. 3), the resistance of the associated FSR 52 increases significantly, which effectively opens an electrical circuit. The opening of this circuit triggers the microprocessor 38 to actuate the ERM vibrator 44, which vibrates the touch screen monitor 22 to provide haptic feedback to the person.

In the first exemplary embodiment, the microprocessor 38, ERM vibrator 44 and FSRs 52 are all electrically connected with one another via wires 34. However, it should be appreciated that these components could alternately communicate with one another wirelessly.

Figure 5:
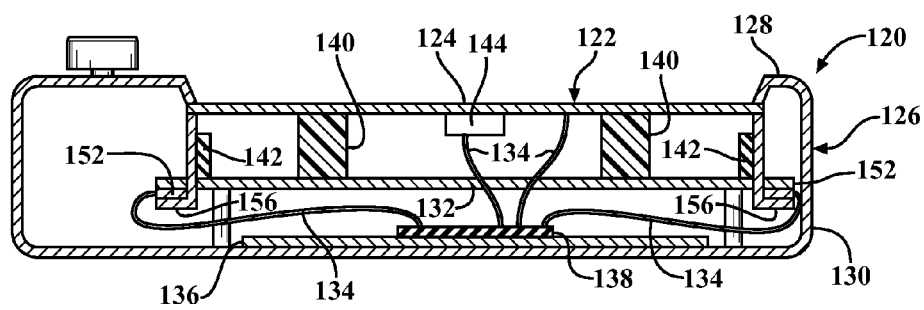
FIG. 5 is a cross-sectional view of an alternate exemplary embodiment of the touch assembly.
Figure 6:
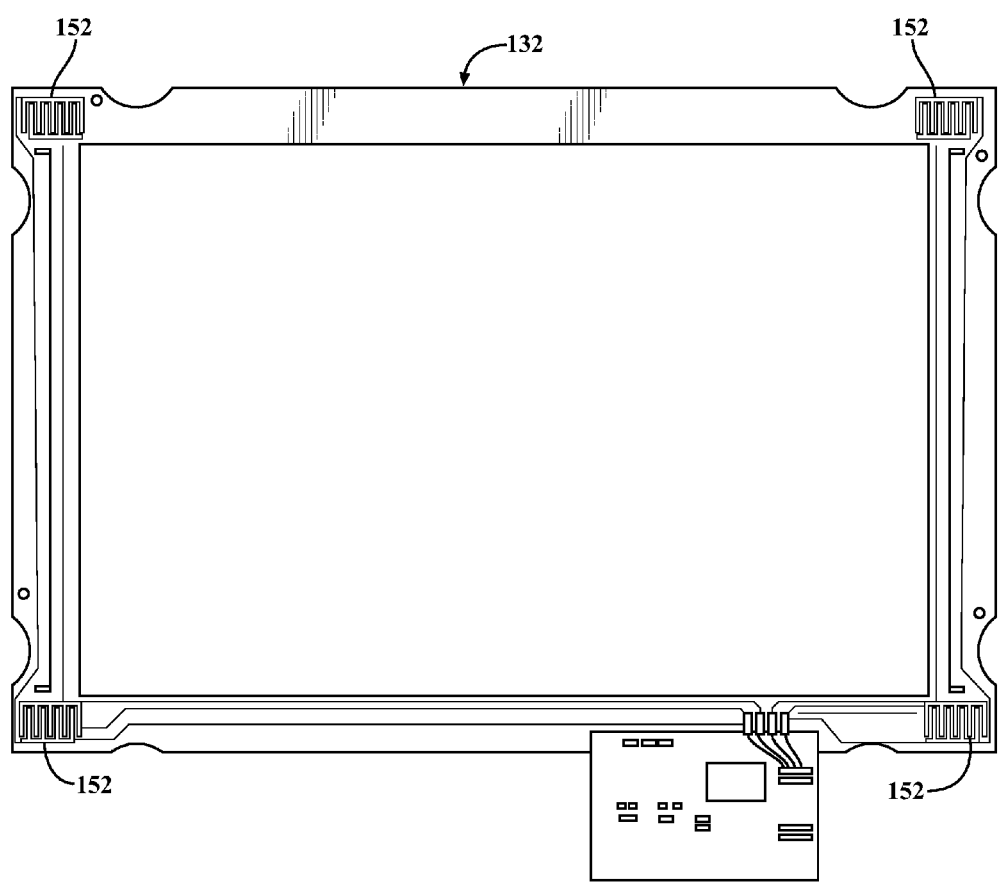
FIG. 6 is a perspective elevation view of a base and a plurality of switches of the alternate exemplary embodiment of the touch assembly.

Referring now to FIG. 5, an alternate embodiment of the touch assembly 120 is generally shown with like numerals separated by a factor of 100 indicating corresponding parts with the above-described embodiment. The second exemplary embodiment is similar to the first discussed above except the haptic feedback device 144 is a piezoelectric element 144 rather than the ERM vibrator 44 discussed above and the switches 152 are capacitive sensors 152 rather than the FSRs 52 discussed above. The piezoelectric element 144 is configured to expand or contract when an electrical current flows through it. Preferably, the microprocessor 138 is configured to send an alternating current through the piezoelectric element 144, which will cause it to expand and contract in a cyclical manner, thereby vibrating the touch screen monitor 122. Adjusting the amplitude and the frequency of the alternating current applied to the piezoelectric element 144 may also change the feel of the vibration to the person. Accordingly, the touch assembly 120 could be configured to provide one feedback when a person presses on a first location of the touch screen monitor 122 and a different feedback when a person presses on a different location of the touch screen monitor 122. The capacitive sensors 152 are configured to change capacitance in response to a change in the force applied by the plungers 156. In operation, the change in capacitance is measured by the microprocessor 138, which activates the piezoelectric element 144 to provide haptic feedback in response to the capacitance measured by the capacitive sensors 152 crossing a predetermined threshold capacitance. The thickness of the capacitive sensors 152 is exaggerated in FIG. 5 because, as shown in FIG. 6, the capacitive sensors 152 of this alternative embodiment are built into the base 132. It should be appreciated that the switches 52, 152 and the haptic feedback devices 44, 144 could be a range of different devices than those shown in exemplary embodiments.

Another aspect of the present invention is a method of operating a touch assembly 20, 120 having a touch surface and a haptic feedback device 44, 144 and at least one switch 52, 152 that is adjustable between an activated condition and a deactivated condition. The at least one switch 52, 152 is configured such that it is in the activated condition when no touch force is applied to the touch surface and adjusts to the deactivated condition in response to a touch force being applied to the touch surface. The method includes the step of monitoring the condition of the at least one switch 52, 152. The method continues with the step of receiving a touch force on the touch surface. The method then proceeds with the step of deactivating the switch 52, 152 in response to the touch surface receiving the touch force. The method continues with the step of activating the haptic feedback device 44, 144 to vibrate the touch surface in response to the switch 52, 152 deactivating. In other words, it is the deactivation, not activation, of the at least one switch 52, 152 that triggers the activation of the haptic feedback device 44, 144. The switch or switches 52, 152 could be FSRs 52, capacitive sensors 152 or any desirable types of switches. The haptic feedback device 44, 144 could be an ERM vibrator 44, a piezoelectric element 144 or any desirable type of haptic feedback device or driver.

The method may proceed with the steps of adjusting the monitoring of the at least one switch 52, 152 in response to the at least one switch 52, 152 being in the deactivated condition to prevent continued deactivation of the at least one switch 52, 152 by the haptic feedback device 44, 144. In other words, the touch assembly 20, 120 automatically prevents the haptic feedback device 44, 144 from entering a loop where it activates itself by deactivating the switch 52, 152.

In one embodiment, this is accomplished by delaying the monitoring of the at least one switch 52, 152 for a duration that is greater than the duration of the activation of the haptic feedback device 44, 144. For example, if the haptic feedback device 44, 144 is configured to activate for a quarter of a second in response to the switch 52, 152 adjusting to the deactivated configuration, then the touch assembly 20, 120 automatically stops monitoring the condition of the at least one switch 52, 152 for more than a quarter of a second before continuing normal monitoring of the condition of the at least one switch 52, 152.

In another embodiment, preventing the self-activation of the haptic feedback device 44, 144 is accomplished by delaying the monitoring of the at least one switch 52, 152 until a predetermined number of vibrations are measured. For example, if the haptic feedback device 44, 144 is configured to activate for twenty cycles, then the touch screen assembly counts the cycles and automatically stops monitoring the condition of the at least one switch 52, 152 until after the twenty cycles have been counted.

In yet another embodiment, preventing the self-activation of the haptic feedback device 44, 144 is accomplished by measuring a signal produced by the switch 52, 152 and allowing the haptic feedback to be reactivated only after the signal produced by the at least one switch 52, 152 crosses a predetermined threshold. For example, if the at least one switch 52, 152 is a force sensitive resistor, then the touch screen assembly may automatically stop monitoring the condition of the at least one force sensitive resistor until its resistance falls below a predetermined level.

Yet another aspect of the present invention is also related to a method of operating a touch assembly 20, 120 having a touch screen, a base 32, 132, a haptic feedback device 44, 144 and at least one switch 52, 152. The at least one switch 52, 152 is adjustable between an activated configuration and a deactivated configuration and is biased into the activated configuration. The method continues with the step of receiving a touch force on the touch surface to move the touch surface. The method proceeds with sensing the location of the touch force on the touch surface. The method further includes the step of adjusting the at least one switch 52, 152 to the deactivated configuration in response to the touch surface moving relative to the base 32, 132. The method continues with the step of transmitting a signal only in response to the location of the touch force being sensed and the at least one switch 52, 152 being in the deactivated condition. The signal transmitted by the touch assembly 20 could be, for example, to trigger a haptic feedback device 44, 144 or to accomplish any desirable action. This is beneficial because it protects against unintended actuation of the touch assembly 20, 120. For example, if the touch assembly 20, 120 is vibrated, the at least one switch 52, 152 might deactivate, but the touch assembly 20, 120 would not actuate because no location of a touch force would be sensed. Alternately, if a person accidentally brushed the touch surface, a location would be sensed, but the touch assembly 20, 120 would not actuate because the at least one switch 52, 152 would not deactivate.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A touch assembly, comprising:
a base;
a touch panel made as a separate piece from said base and having a touch surface for receiving a touch force positioned on one side of said base;
at least one haptic feedback device coupled to said touch surface;

at least one switch operably coupled with said touch surface and adjustable between an deactivated configuration with an open electrical circuit being established and an activated configuration with a closed electrical circuit being established, said at least one switch being attached with said base on an opposite side of said base from said touch surface;

at least one microprocessor in electrical communication with said at least one haptic feedback device and with said at least one switch for actuating said at least one haptic feedback device in response to said at least one switch adjusting from said activated configuration to said deactivated configuration;

at least one biasing element positioned between said touch surface and said base and biasing said touch surface away from said base;

a plunger operably coupled with said touch surface and extending through an opening in said base to the side of said base opposite of said touch sensor and being biased into engagement with said switch by said at least one biasing element to bias said switch into said activated configuration with said closed electrical circuit being established and wherein said plunger is separable from said switch in response to said touch surface moving towards said base to adjust said switch into said deactivated configuration with said open electrical circuit being established;

wherein said at least one switch is a plurality of force sensing resistors which are directly fixed to at least an electrically unconductive portion of said base on an opposite side of said base from said touch surface; and wherein said microprocessor is configured to monitor said at least one switch in response to said at least one switch being in said deactivated configuration and to monitor said haptic feedback device to automatically prevent continued deactivation of said at least one switch by said haptic feedback device preventing said haptic feedback device from entering a loop where said haptic feedback device activates itself by deactivating said switch.

2. The touch assembly as set forth in claim 1 wherein said at least one biasing element is at least one spring.

3. The touch assembly as set forth in claim 2 further including at least one stopper disposed between said touch screen monitor and said base for limiting movement of said touch surface relative to said base.

4. The touch assembly as set forth in claim 3 wherein said at least one stopper is configured to limit movement of said touch surface relative to said base to approximately 0.25 mm.

5. The touch assembly as set forth in claim 3 wherein said at least one stopper is of an elastomeric material.

6. The touch assembly as set forth in claim 1 wherein said plurality of force sensing resistors are electrically connected to one another in a serial electrical relationship.

7. The touch assembly as set forth in claim 1 wherein said touch surface is a touch screen monitor.

8. The touch assembly as set forth in claim 1 wherein said haptic feedback device is an eccentric rotating mass vibrator including an electrical motor and a non-symmetrical mass.

9. The touch assembly as set forth in claim 1 wherein said haptic feedback device is a piezoelectric element.

10. The touch assembly as set forth in claim 1 wherein said base is generally planar.

11. The touch assembly as set forth in claim 1 wherein said microprocessor is configured to activate said haptic feedback device for a predetermined number of cycles and to deactivate said haptic feedback device after the predetermined number of cycles and to delay monitoring of said at least one switch during activation of said haptic feedback device and to resume monitoring of said at least one switch in response to said haptic feedback device deactivating.

\* \* \* \* \*